United States Patent [19]

Baturay et al.

[11] Patent Number: 5,007,960
[45] Date of Patent: Apr. 16, 1991

[54] METHOD FOR REMOVING CHROMIUM FROM CHROMIUM CONTAINING WASTE MATERIAL

[75] Inventors: Omar Baturay, City Island, N.Y.; James E. Shirk, Jersey City; Adam L. Sigerson, Sussex, both of N.J.

[73] Assignee: Chrome Technology Inc., Trenton, N.J.

[21] Appl. No.: 421,136

[22] Filed: Oct. 13, 1989

[51] Int. Cl.$^5$ .............................................. C01G 37/00
[52] U.S. Cl. ................................................... 75/743
[58] Field of Search ...................... 75/738; 423/53, 54, 423/55, 596

[56] References Cited

U.S. PATENT DOCUMENTS

| | | | |
|---|---|---|---|
| 3,816,094 | 6/1974 | Low et al. | 75/3 |
| 3,816,095 | 6/1974 | Bruen et al. | 75/3 |
| 3,819,800 | 6/1974 | Shaffer et al. | 423/58 |
| 3,856,917 | 12/1974 | Texier et al. | 423/54 |
| 3,932,598 | 1/1976 | Cooper et al. | 423/596 |
| 3,937,785 | 2/1976 | Gancy et al. | 423/53 |
| 3,981,965 | 9/1976 | Gancy et al. | 423/55 |
| 4,171,248 | 10/1979 | Carlin | 204/89 |
| 4,318,788 | 3/1982 | Duffey | 204/149 |
| 4,668,483 | 5/1987 | Ladd | 75/743 |

OTHER PUBLICATIONS

"Thermal Stripping Treatment of Soils Contaminated with Volatile Organic Compounds", J. W. Noland et al., APCA, Jun. 1987.
"Chromate Chemical Production Industry: Waste Treatment Past and Present", T. McKee, New Jersey Dept. of Environmental Protection.

Primary Examiner—Peter D. Rosenberg
Attorney, Agent, or Firm—Kenyon & Kenyon

[57] ABSTRACT

A method is provided for removing chromium from a chromium containing waste material wherein the waste material is dried by indirect heating, sized to a particle size of less than 0.105 mm, mixed with alkaline and oxidizing reactants, and reacted in a reaction vessel by indirect heating using approximately the stoichiometric oxygen requirement to form a reaction material containing water soluble chromates. The reaction material is cooled and resized, and then subjected to an aqueous solvent extraction to produce a solid phase containing substantially no chromium and an aqueous phase containing water soluble chromates. This aqueous phase is subjected to evaporation resulting in a concentrated chromate phase. The waste material has been rendered non-hazardous and the chromium has been recovered as useful chromates.

19 Claims, 2 Drawing Sheets

METHOD FOR REMOVING CHROMIUM FROM CHROMIUM CONTAINING WASTE MATERIAL

FIELD OF THE INVENTION

The present invention is directed to a method for removing chromium from chromium containing waste material to render said waste material non-hazardous and to recover the chromium in useful form.

BACKGROUND OF THE INVENTION

Chromium containing waste materials may typically be residual chromium wastes resulting from the processing of ferrous chromite ore or soils contaminated as the consequence of disposal practices associated with the disposal of such process wastes. Chromium ore processing wastes can contain up to ten percent by weight chromium. Soils contaminated by process wastes can contain chromium in amounts exceeding 1000 milligrams per kilogram (0.1 percent by weight). Such chromium ore processing wastes and chromium contaminated soils are recognized as a health hazard. Thus, there is a need for improved processes for the removal of chromium from ore processing wastes and contaminated soils so as to reduce the chromium to environmentally acceptable levels. Such improved process should also provide the secondary beneficial result of recovering the removed chromium in industrially useful forms. Processes for the removal of chromium from chromium containing waste material should themselves be capable of operation in an environmentally safe manner.

OBJECTS OF THE INVENTION

It is an object of the present invention to provide a method for the removal of chromium from chromium containing waste materials such as chromium ore processing wastes, soils contaminated by chromium as a consequence of waste disposal practices and similar type wastes so that the chromium content of such wastes is reduced to environmentally safe levels.

It is another object of the present invention to provide a method for the removal of chromium from chromium ore processing wastes or chromium contaminated soil such that the chromium levels in the waste or soil are reduced sufficiently to properly dispose of the chromium ore wastes or to replace the chromium ore wastes or the treated soil in its original site.

It is yet another object of the present invention to provide a method for the removal of chromium from chromium containing waste material which recovers the removed chromium in a useful form.

It is a further object of the present invention to provide a method for the removal of chromium from chromium containing waste material which can be operated in an environmentally safe manner.

It is yet a further object of the present invention to provide a method for the removal of chromium from chromium containing waste material in an economic and efficient manner.

These and other objects of the present invention will be apparent from the following description and claims taken in conjunction with the drawings.

SUMMARY OF THE INVENTION

In accordance with the method of the present invention, chromium containing waste material is first dried. As used herein, chromium containing waste material means chromium containing wastes resulting from ore processing, soils contaminated by chromium, and similar waste materials. Preferably, the chromium containing waste material is in particulate form and it is dried by indirect heating in an enclosed chamber having heated counter rotating screws contacting the waste material whereby the drying of the particulate waste material is accomplished with minimal air entrainment.

After drying, the waste material is then mixed with alkaline reactants and oxidants. After the addition of the alkaline reactants and oxidants, the waste material is sized, for example by a milling machine, to a particle size of preferably less than 0.105 mm (150 mesh). The term mesh used herein refers to U.S. Sieve Series.

The mixed material is then reacted with oxygen in an enclosed chamber for a time and at a temperature sufficient to react substantially all the chromium to water soluble chromate material. Thus, a reaction material containing water soluble chromate material is formed. The preferred water soluble chromate material is sodium chromate.

An important feature of the present invention is that oxygen is supplied to the enclosed reaction chamber at levels approximately equal to the stoichiometric oxygen requirements of the reaction. Oxygen is preferably supplied in the form of air supplied only in an amount sufficient to provide the stoichiometric oxygen requirements of the reaction plus minimal excess air as required by the efficiency of the reaction.

Another important feature of the present invention is the use of an indirectly heated reaction vessel. In such a reaction vessel, the mixed waste and reactants are indirectly heated, with agitation of the reacting mass, at a controlled temperature for a controlled period of time. Indirect heating of the reacting mass may be accomplished by directly heating an enclosing shell of a rotating flighted cylindrical vessel by inductance heating or resistance heating. Agitation of the reacting mass may be accomplished by the presence of ceramic balls within the rotating cylinder or by the fixing of chains on the interior wall of the rotating cylinder.

Another enclosed reaction vessel may be one which contains heated counter rotating screws to provide heat for the reaction and simultaneously mixing and moving the material through the enclosed reaction vessel. The counter rotating screws of the reaction vessel are suitably heated by induction or resistance heating.

In accordance with the present invention, indirect heating means transfer of heat by radiation or conduction from heating elements or heat sources other than by direct contact between the heated material and a fluid heat transfer medium.

The reaction material is removed from the reaction vessel, suitably by an enclosed screw type conveyor, and then cooled, suitably to a temperature of less than 100° C., and resized to a particle size of preferably less than 0.105 mm (150 mesh). The cooled reaction material is then subjected to extraction using an aqueous solvent to remove the water soluble chromates from the reaction material. Extraction is preferably carried out by a multiple stage counter current extraction.

The clean solids resulting from the extraction step are dried and then disposed of in an environmentally sound manner or returned to their original site.

The chromate containing aqueous solvent resulting from the extraction is evaporated thereby providing an useful concentrated chromate phase which is preferably sodium chromate. If sodium dichromate is desired, the concentrated chromate phase may be acidified after evaporation or dissolved aqueous solvent containing sodium chromate may be acidified prior to evaporation.

The process of the present invention permits the use of portable equipment for in situ treatment of wastes.

BRIEF DESCRIPTION OF THE DRAWINGS

In the drawings forming part hereof.

DESCRIPTION OF THE PREFERRED EMBODIMENTS

In order to provide a more complete understanding of the method of the present invention and an appreciation of its advantages, a description of the preferred embodiments is presented below.

Figure 1:
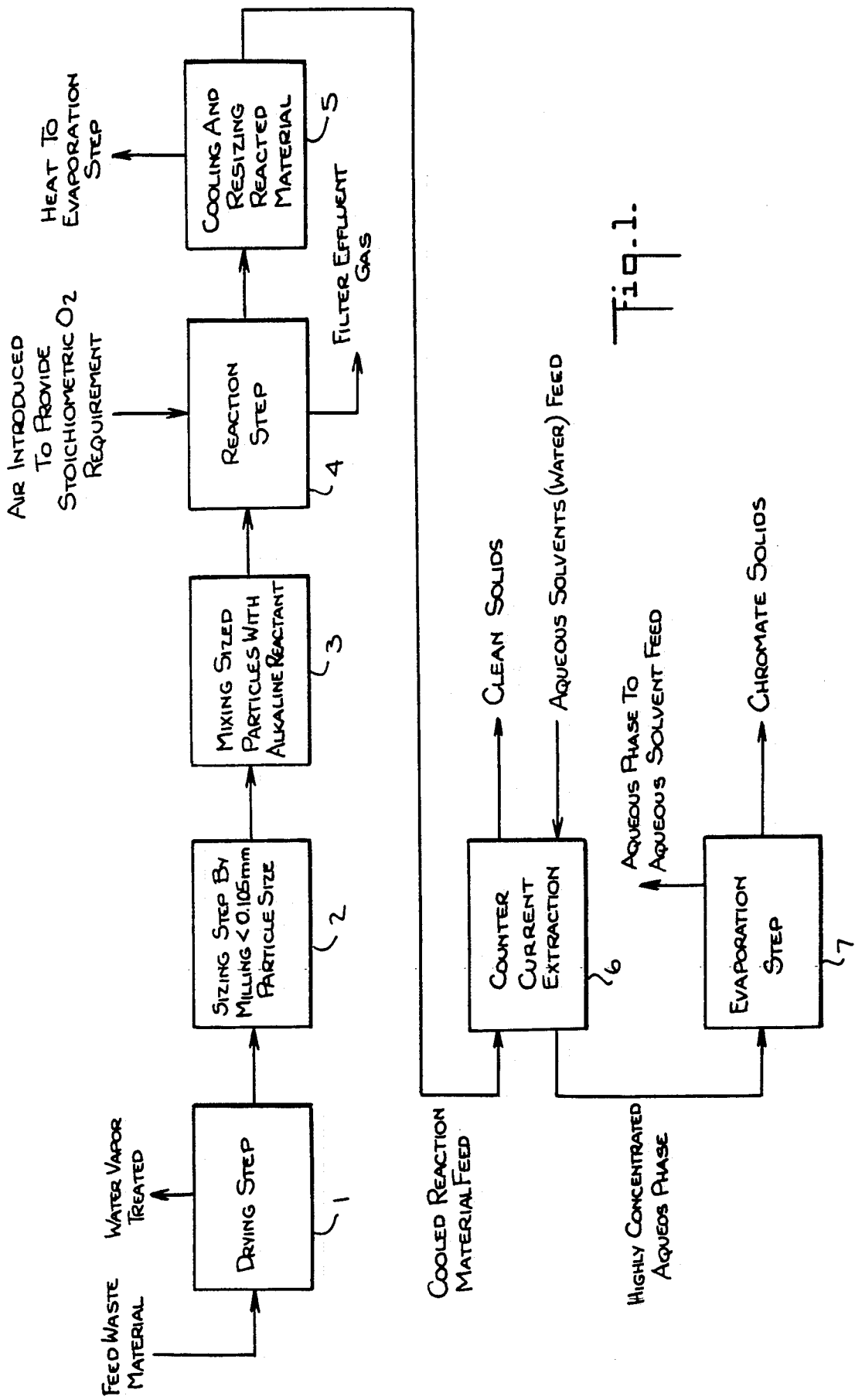
FIG. 1 is a flow diagram of one embodiment of the method in accordance with the present invention.

The chromium containing waste material is first subjected to a drying step illustrated at 1 in FIG. 1. Preferably, the drying step is performed by heating the chromium containing waste material by contacting the material with heated counter rotating screws located in an enclosed chamber with the chromium containing waste material being fed to this drying chamber in particle form. The counter rotating screws may be suitably heated by electrical resistance or hot oil heating. The rate of feed may be suitably about 375 to 750 kilograms/min. The temperature of drying may be suitably about 170 to 240° C. with a total drying time on the order of about 5 to 15 minutes. Performing the drying step with the preferred counter rotating screws in the enclosed chamber ensures a minimum amount of air entrainment in the particulate chromium containing material, thus reducing potential hazardous conditions due to airborne emissions. The water vapor generated by the drying step is conveyed to a treatment apparatus utilizing a high efficiency particulate absolute (HEPA) filter apparatus prior to venting to atmosphere.

Following drying, a sizing step takes place as illustrated at 2 in FIG. 1. The dried material is conveyed, e.g., by an enclosed screw conveyor, to a ball mill or similar mechanism and reduced in size to a particle size of less than 0.105 mm (150 mesh) and preferably less than 0.044 mm (325 mesh). The average particle size of the milled material may be on the order of, e.g., 0.075 mm (200 mesh) to 0.035 mm (400 mesh). It will be appreciated that the milling or similar process will take place in an enclosed chamber allowing no emissions.

Following the sizing step, there is a mixing step as illustrated at 3 in FIG. 1 wherein the very fine sized chromium containing material is mixed with reactants at ratios required to create proper alkaline oxidizing conditions in the subsequent reaction step (4 in FIG. 1) to maximize the efficient reaction of the chromium in the waste material to water soluble chromates. These ratios are readily determined by one skilled in the art based upon the reactants selected and the content of the chromium in the material being treated. Chromium is typically found in the waste material in the reduced form. If desired, the reactants may be mixed with the chromium containing material during the sizing in the ball mill or similar device.

Preferred reactants are sodium carbonate, or sodium carbonate and sodium nitrate, or sodium carbonate and ammonium nitrate. Sodium carbonate and other suitable oxidants or other suitable alkaline reactants and oxidant combinations may be employed. When sodium carbonate is the reactant, a suitable ratio is about 5 to 50 parts by weight sodium carbonate to about 1 part by weight chromium present in the material, with a ratio of about 30 parts by weight sodium carbonate to about 1 part by weight chromium being preferred. When sodium carbonate and sodium nitrate are the reactants, a suitable ratio is about 1 to 50 parts by weight sodium carbonate to about 1.5 to 30 parts by weight sodium nitrate, to about 1 part by weight chromium in the material. It has been found useful to employ about 0.5 to 3 parts by weight sodium carbonate, to about 0.1 to 1 part by weight sodium nitrate, to 1 part by weight chromium bearing material, with about 0.7 parts by weight sodium carbonate to about 0.1 parts by weight sodium nitrate to about 1 part by weight chromium bearing material being preferred.

When sodium carbonate and ammonium nitrate are the reactants, a suitable ratio is about 1 to 50 parts by weight sodium carbonate to about 1.5 to 30 parts by weight ammonium nitrate to about 1 part by weight chromium in the material. It has been found useful to employ about 0.5 to 3 parts by weight sodium carbonate to about 0.1 to 1 part by weight ammonium nitrate to about 1 part by weight of the chromium bearing material, with about 0.7 parts by weight sodium carbonate to about 0.1 parts by weight ammonium nitrate to about 1 part by weight chromium bearing material being preferred.

The reaction step follows the mixing step or sizing-mixing step as illustrated at 4 in FIG. 1. The reaction step takes place in an enclosed vessel with the mixed material being transported to the enclosed vessel, e.g., by an enclosed screw conveyor. In the reaction step, the mixed material is reacted with oxygen at a temperature and for a time sufficient to react substantially all chromium in the waste material to water soluble chromates. Typically about 99.5 percent to 99.9 percent of the chromium present in the waste material is reacted to water soluble chromates during the reaction step. The time and temperatures of the reaction step are readily ascertainable by one skilled in the art. When the reactants are sodium carbonate, or sodium carbonate and sodium nitrate, or sodium carbonate and ammonium nitrate, the chromium is substantially reacted to the water soluble sodium chromate.

An important feature of the present invention is that the oxygen introduced into the closed reaction vessel during the reaction step is limited to approximately the stoichiometric oxygen requirements required by the reaction. The stoichiometric oxygen requirements required by the reaction can be readily determined by one skilled in the art knowing the type and amount of alkaline reactants and the amount of chromium in the reaction. The oxygen may be added to the reaction in either gaseous form or in combined solid and gaseous form. The oxygen is preferably added to the reaction in the form of air, with the amount of air added to the reaction being limited to the amount of air sufficient to supply approximately the stoichiometric oxygen requirements of the reaction in accordance with the teachings of the present invention.

The oxygen is limited to the approximate stoichiometric amount required for the reaction, in accordance with the method of the present invention, in order to reduce potential health and safety impacts caused by the method. Chromium, particularly in the oxidized state (Cr+6) following the reaction step, is known as a potent lung carcinogen. The method of the present invention by strictly limiting the oxygen from gaseous sources in the reaction step substantially precludes the entrainment and carryover of fine chromium particles or other fine particulate material from the reaction step into the atmosphere. This is further important because all air treatment processes by their nature are less than 100 percent effective, resulting in some emission of chromium containing respirable dust particles into the environment. Rotary kilns and batch charge furnaces of chromite ore benefication processes are, in contrast to the present invention, characteristically high air volume processes with attendant significant particulate carry over.

If sodium carbonate is the reactant, suitably 0.6 parts by weight oxygen (3 parts by weight air) to 10 parts by weight sodium carbonate, to 1 part by weight chromium could be employed. If sodium carbonate and sodium nitrate are the reactants, suitably 0.3 parts by weight oxygen (1.5 parts by weight air) to 10 parts by weight sodium carbonate, to 5 parts by weight sodium nitrate to 1 part by weight chromium could be employed. If sodium carbonate and ammonium nitrate are the reactants, suitably 0.3 parts by weight oxygen (1.5 parts by weight air) to 10 parts by weight sodium carbonate, to 10 parts by weight ammonium nitrate, to 1 part by weight chromium could be employed.

Limiting the amount of oxygen to approximately the stoichiometric amount also minimizes the formation of oxidized nitrogen gas, a major pollutant, during the reaction. The effluent gas from the reaction is passed, without induced draft, through an APC apparatus utilizing a high efficiency particle absolute (HEPA) filter to atmosphere. A preferred filter would be an ANKE™ filter system manufactured by ANKE GmbH, Muggenstum, Federal Republic of Germany.

The method of the present invention, by limiting the amount of oxygen in the reaction vessel to approximately the stoichiometric amount, results in the gas which is discharged from the reaction vessel to atmosphere containing very low levels of chromium and oxidized nitrogen.

A suitable main reaction vessel would be a flighted indirectly heated rotary furnace cylinder manufactured by Vulcan Iron Works of Wilkes Barre, PA. Indirect heating of the reacting material would be accomplished by inductance heating or resistance heating or passage of flue gas around the enclosing shell of the rotating cylindrical vessel. The reacting material would be agitated, for example, by the presence of ceramic balls within the rotating cylindrical vessel. The reaction vessel is suitably provided with air plenums adjustable to permit control of the quantity of air supplied to the reaction to be such that only sufficient air is added to supply the approximate stoichiometric oxygen requirements of the reaction. The reacted material is typically heated at a temperature of about 950° C. to 1150° C. for a time of about 5 minutes to 45 minutes. As hereinbefore discussed, the specific reaction temperature and time required to react substantially all of the chromium in the reacted waste material to water soluble chromates can be readily determined by one skilled in the art.

The reaction step is followed by the cooling and resizing of the reacted material as illustrated at 5 in FIG. 1. The reaction material containing water soluble chromate is removed from the reaction vessel and transported to the cooling and resizing vessel preferably using fully enclosed screw type conveyors. The cooling and resizing vessel is suitably an enclosed ball mill which also provides for cooling. Such a ball mill may be, e.g., a pebble mill manufactured by Allis Chalmers of Milwaukee, WI.

The reaction material is cooled and resized in the cooling step to a temperature of less than 100° C. Preferably, the reaction material is cooled to a temperature of about 40° C. to about 50° C. and resized to approximately the same particle sizes set forth for the original sizing. The cooling and resizing vessel is an enclosed vessel. If desired, the cooling and resizing may take place in separate steps.

After the cooling and resizing step, the cooled reaction material is transported, e.g., by an enclosed screw conveyor, to the extraction step illustrated at 6 in FIG. 1. In the extraction step, substantially all the water soluble chromate is removed from the cooled reaction material by mixing with an aqueous solvent, i.e., water. The extraction step thus results in a liquid phase comprising the aqueous solvent having a high concentration of dissolved water soluble chromate and a solid phase containing only environmentally acceptable levels of chromium.

The preferred extraction step in the method of the present invention is a counter current washing method hereinafter described in detail in conjunction with FIG. 2. In the counter current washing extraction the weight ratio of the clean aqueous solvent (water) to the weight of water soluble chromates in the cooled reaction material is about 3 to 5 parts by weight water to about 1 to 15 parts by weight water soluble chromates. The ratio of water to water soluble chromates is selected to result in the extraction of substantially all of the water soluble chromates from the cooled reaction material so as to result in a chromium level in the solids which is environmentally acceptable.

In the preferred counter current extraction of the present invention, the aqueous solvent flows alternately into successive mixing and solids concentrating stages. With this method, successively dewatered solids are mixed with more dilute solvent at each extraction stage as the solid material progresses through the process. In contrast, as the solvent progresses through the process, it becomes increasingly concentrated with the soluble chromium extracted from the solid phase. This provides for true counter current extraction and makes maximum efficient use of the solvent (water) and maximum removal of residual chromate in the solid phase. The serial process continues until the soluble chromium is substantially fully extracted from the solid phase and substantially fully contained in the solvent liquor. The extraction results in a final concentration of chromium in the source material that allows environmentally acceptable disposal of the treated material or environmentally acceptable replacement of the treated material at the original site.

The counter current extraction step of the method of the present invention is preferably a multiple stage process. A four stage process is illustrated in FIG. 2. It will be appreciated that the counter current extraction step could be practiced as a three stage, five stage, six stage, etc., process if so desired to achieve acceptable results.

Figure 2:
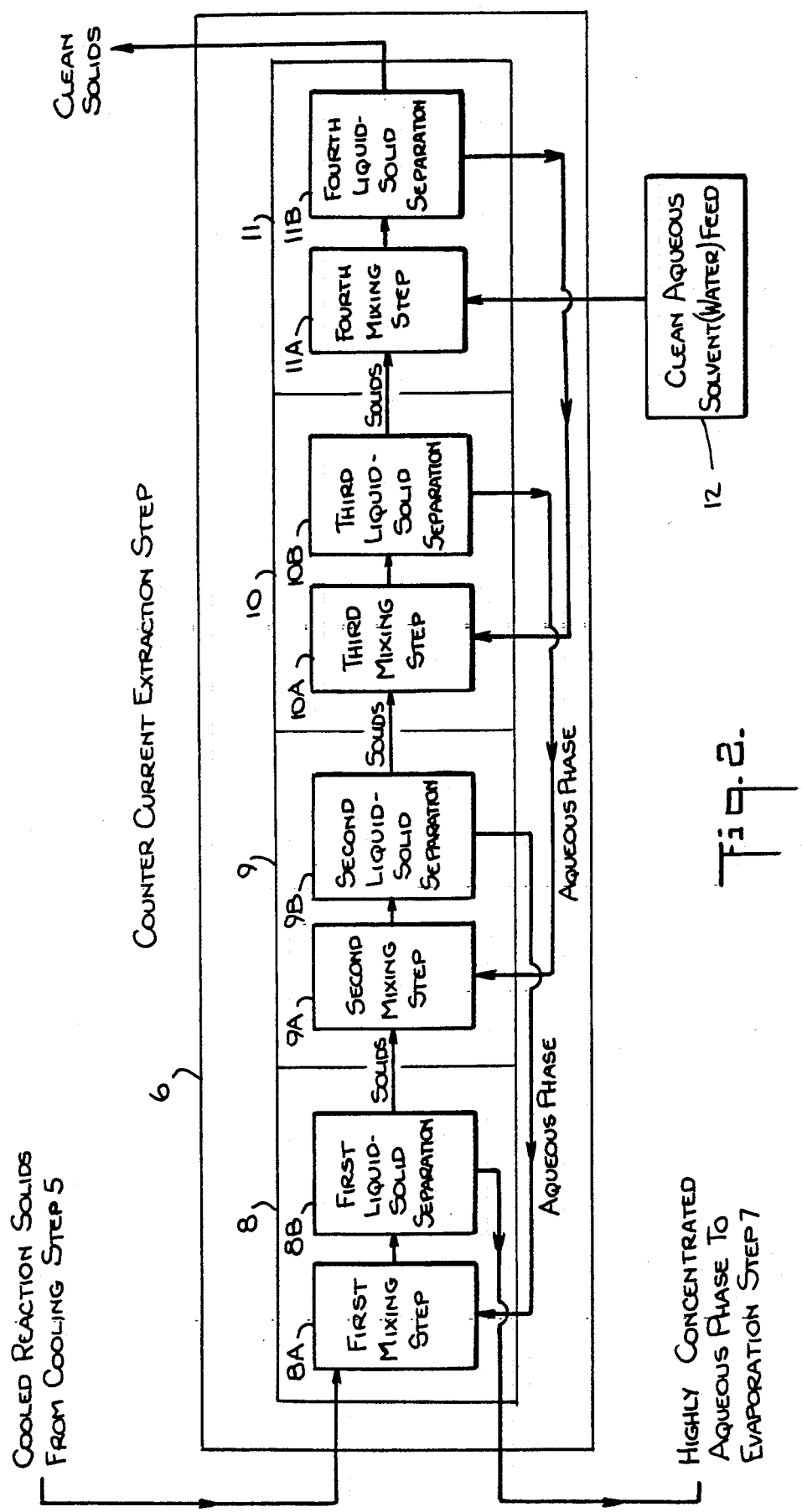
FIG. 2 is a flow diagram of a preferred multiple stage counter current washing extraction step of one embodiment of the method in accordance with the present invention.

With reference to FIG. 2, each stage 8, 9, 10, 11 of the four stage counter current extraction step comprises a mixing unit 8A, 9A, 10A, 11A for performing a mixing step and liquid-solid separation unit 8B, 9B, 10B, 11B comprising hydrocyclones for performing a liquid-solid separation step.

Cooled reaction material solids are introduced from the cooling step 5 into the first mixing unit 8A and aqueous solvent having a fairly high concentration of dissolved water soluble chromates is introduced into the first mixing unit 8A from second liquid-solid separation unit 9B. Mixing takes place in the mixing unit 8A resulting in a first mixture which is transported to the first liquid-solid separation unit 8B. The mixed aqueous solvent and the solid reaction material are separated in the first liquid-solid separation unit 8B. The separated aqueous solvent has a high soluble chromate level (higher than the soluble chromate level of the aqueous solvent introduced into the first mixing unit 8A) and this highly concentrated soluble chromate aqueous solvent is transported to the evaporation step 7 (hereinafter discussed). The separated solid reaction material has a decreased soluble chromate content compared to the soluble chromate content of the reaction material introduced into the first mixing unit 8A and this separated solid reaction material having the decreased soluble chromate level is introduced into the second mixing unit 9A.

Aqueous solvent containing dissolved chromate from the third liquid-solid separation unit 10B is also introduced into the second mixing unit 9A where it is mixed with the solid reaction material introduced from the first liquid-solid separation unit 8B. Mixing takes place resulting in a second mixture which is transported to the second liquid-solid separation unit 9B. The mixed aqueous solvent and solid reaction material are separated in the second liquid-solid separation unit 9B. The separated aqueous solvent has a higher dissolved chromate level than the aqueous solvent from the third liquid-solid separation unit 10B, and, as hereinbefore discussed, the separated aqueous solvent from second liquid-solid separation unit 9B is transported to first mixing unit 8A. The separated solid reaction material has a further decreased soluble chromate content compared to the decreased soluble chromate content of the solid reaction material separated by first liquidsolid separation unit 8B and this separated solid reaction material having the further decreased chromate content is introduced into the third mixing unit 10A.

Aqueous solvent containing dissolved chromate from the fourth liquid-solid separation unit 11B is also introduced into the third mixing unit 10A where it is mixed with the solid reaction material introduced from the second liquid-solid separation unit 9B. Mixing takes place resulting in a third mixture which is transported to the third liquid-solid separation unit 10B. The mixed aqueous solvent and solid reaction material are separated in the third liquid-solid separation unit 10B. The separated aqueous solvent has a higher dissolved chromate level than the aqueous solvent from the fourth liquid-solid separation unit 11B, and, as hereinbefore discussed, the separated aqueous solvent from the third liquid-solid separation unit 10B is transported to the second mixing unit 9A. The separated solid reaction material has a still further decreased chromate content compared to the further decreased chromate content of the solid reaction material separated by the second liquid-solid separation unit 9B and this separated solid reaction material having the still further decreased chromate content is introduced into the fourth mixing unit 11A.

Clean aqueous solvent, i.e., water which is substantially free of dissolved chromate is also introduced into the fourth mixing unit 11A from reservoir 12 where it is mixed with the solid reaction material introduced from the third liquid-solid separation unit 10B. Mixing takes place resulting in a fourth mixture which is transported to the fourth liquid-solid separation unit 11B. The mixed aqueous solvent and solid reaction material are separated in the fourth liquid-solid separation unit 11B. The separated aqueous solvent has a higher dissolved chromate level than the clean aqueous solvent, and, as hereinbefore discussed, the separated aqueous solvent from the fourth liquid-solid separation unit 11B is transported to the third mixing unit 10A. The separated solid reaction material has a yet still further decreased soluble chromate content compared to the still further decreased soluble chromate content of the solid reaction material separated by the third liquid-solid separation unit 10B.

In this embodiment of the illustrated four stage counter current extraction step, the solid reaction material separated by the fourth liquid-solid separation unit 11B is substantially free of chromium in both the solid and entrained liquid phases, i.e., the separated clean solids contain chromium at environmentally acceptable levels.

Thus, the multiple stage counter current extraction step results in two phases: an aqueous phase containing highly concentrated dissolved chromate and a solid phase comprising clean solids and associated entrained solvent containing only environmentally acceptable levels of chromium.

The clean solids from the counter current extraction step are then dewatered or dried. The dewatered clean solids contain about 100 mg/Kg to 500 mg/Kg chromium. The dewatered clean solids may be safely disposed of in an environmentally sound manner or returned to the original site from which the previously contaminated waste was removed.

The aqueous phase produced by the counter current extraction step 6 containing highly concentrated dissolved chromates is then processed by multiple effect evaporation. This aqueous solvent typically contains about 7 wt.% to 15 wt.% sodium chromate. The evaporator would be suitably provided with a corrosion protective liner such as a glass or ceramic liner. Heat from the cooling step and the reaction step may be employed in the evaporation step. The evaporation step typically takes place at a temperature of about 120° C. to 180° C.

The evaporation step evaporates the water soluble chromate containing aqueous phase thereby providing a concentrated chromate phase and water. The water may be returned for use in the counter current extraction step 6. The chromate phase is useful sodium chromate or sodium dichromate which may be stockpiled for sale.

If the concentrated chromate phase is sodium chromate, this solid phase may be acidified by, e.g., sulfuric acid either before or after evaporation to provide a sodium dichromate product.

The method of the present invention removes chromium from chromium contaminated waste material in an economic and efficient manner. The method of the present invention can be operated in an environmentally acceptable manner as either a portable unit located at a contaimination site or as a central processing unit. The method of the present invention also provides useful chromates.

EXAMPLE

A waste material containing about 6 weight percent chromium is dried in an enclosed vessel by use of indirect heating at a temperature of about 240° C. for about 15 minutes. The dried waste material is sized in a ball mill to a particle size of about 0.045 mm to 0.035 mm. The sized waste material is then mixed with the reactants sodium carbonate and ammonium nitrate in a proportion of 10 parts by weight sodium carbonate to 10 parts by weight ammoninum to 1 part by weight chromium. The mixed sized waste material and reactants are then heated using indirect heating and agitated in an enclosed reaction vessel at a temperature of about 1000° C. for about 15 minutes. Air is introduced into the reaction vessel in the amount of about 3 parts by weight air, to about 10 parts by weight sodium carbonate, to about 10 parts by weight ammonium nitrate, to about 1 part by weight chromium. This amount of air provides approximately the stoichiometric amount of air required for the reaction. About 99.9 percent of the chromium in the reacted waste material is reacted to sodium chromate. The reacted waste material is then resized to a particle size of about 0.105 mm to 0.045 mm and cooled to a temperature of about 60° C. The resized and cooled reacted waste material is then subjected to four stage counter current extration using water as the solvent. The resized and cooled reacted waste material contains about 6 weight percent chromium. Water is employed in the amount of about 3 parts water to 1 part chromium in the resized and cooled reacted waste material. After the four stage counter current extraction, the liquid phase contains about 10 weight percent sodium chromate and the solid phase contains 100 mg/Kg of chromium. The liquid stage is evaporated at a temperature of greater than 100° C. and greater than 99 percent of the sodium chromate in the liquid phase is recovered.

Although preferred embodiments of the present invention have been described in detail, it is contemplated that modifications may be made by one skilled in the art all within the spirit and the scope of the present invention as defined in the claims.

What is claimed is:

1. A method for extracting chromium is the form of chromate from material containing chromium, said method comprising:
   drying by indirect heating said material containing chromium;
   sizing said dried material containing chromium to a particle size of less than 0.105 mm;
   mixing said sized material containing chromium with an alkaline reactant;
   reacting said mixed sized material containing chromium and alkaline reactant with oxygen by heating said mixed sized material in the presence of oxygen by indirect heating in an enclosed reaction vessel for a time and at a temperature to react substantially all the chromium to water soluble chromate thereby forming a reaction material containing water soluble chromate;
   limiting the oxygen present in said enclosed reaction vessel during said reacting step to approximately stoichiometric oxygen requirements of said reaction;
   removing said reaction material containing water soluble chromate from said reaction vessel and resizing and cooling said reaction material, said resized reaction material having a particle size of less than 0.105 mm; thereafter,
   extracting said water soluble chromate from said reaction material using an aqueous solvent thereby providing an aqueous phase containing water soluble chromate and a clean solid phase substantially free from chromium;
   evaporating said water soluble chromate containing aqueous phase thereby providing a concentrated chromate phase.

2. A method according to claim 1 wherein said alkaline reactant is sodium carbonate and said sodium carbonate is mixed with said sized material containing chromium in a ratio of about 0.5 to 3 parts by weight sodium carbonate to 1 part by weight said sized material containing chromium.

3. A method according to claim 1 wherein said alkaline reactant is sodium carbonate and there is further provided sodium nitrate oxidant reactant; said sodium carbonate and sodium nitrate being mixed with said sized material containing chromium in a ratio of about 0.5 to 3 parts by weight sodium chromate, to about 0.1 to 1 parts by weight sodium nitrate, to 1 part by weight said sized material containing chromium.

4. A method according to claim 1 wherein said alkaline reactant is sodium carbonate and there is further provided ammonium nitrate oxidant reactant; said sodium carbonate and said ammonium nitrate being mixed with said sized material containing chromium in a ratio of about 0.5 to 3 parts by weight sodium carbonate, to about 0.1 to 1 parts by weight ammonium nitrate, to 1 part by weight said sized material containing chromium.

5. A method according to claim 1 wherein said concentrated chromate phase provided by said evaporating step contains sodium chromate, said method further including the step of acidifying said concentrated sodium chromate phase thereby providing a concentrated sodium dichromate phase.

6. A method according to claim 1 wherein said water soluble chromate containing aqueous phase provided by said extration step contains sodium chromate, said method further comprising the step of acidifying said sodium chromate aqueous phase prior to said evaporation step thereby providing a sodium dichromate liquid phase.

7. A method according to claim 1 wherein oxygen is provided to said reacting step by supplying air into said enclosed reaction vessel in an amount sufficient to provide approximately said stoichiometric oxygen requirements of said reaction.

8. A method according to claim 1 wherein said clean solid phase provided by said extracting step is dried.

9. A method according to claim 8 wherein said dried clean solid phase contains 100 mg/Kg to 500 mg/Kg chromium.

10. A method according to claim 1 wherein said extraction step is a multistage counter current extraction.

11. A method for extracting chromium in the form of chromate from particulate material containing chromium, said method comprising:
   drying said particulate material containing chromium by conveying said material through an enclosed chamber having heated conveyance means contacting said waste material, said conveyance means thereby performing said drying by indirect heating with minimum air entrainment in said particulate waste material;

sizing said dried particulate material containing chromium to a particle size of less than 0.105 mm;

mixing said sized material containing chromium with an alkaline reactant;

reacting said mixed sized material containing chromium and said alkaline reactant with oxygen by heating said mixed sized material in the presence of oxygen by indirect heating in an enclosed reaction vessel for a time and at a temperature sufficient to react substantially all the chromium to water soluble chromate thereby forming a reaction material containing water soluble chromate;

providing oxygen to said reacting step by supplying air into said enclosed reaction vessel in an amount providing approximately stoichiometric oxygen requirements of said reaction;

removing the reaction material containing water soluble chromate from said reaction vessel and resizing and cooling said reaction material, said resized reaction material having a particle size of less than 0.105 mm; thereafter, extracting said water soluble chromate from said reaction material using an aqueous solvent thereby providing an aqueous phase containing water soluble chromate and a clean solid phase substantially free from chromium, said extracting step being a multistage counter current extration;

evaporating said water soluble chromate containing aqueous phase thereby providing a concentrated chromate phase.

12. A method according to claim 11 wherein said conveyance means comprise heated counter rotating screws drying said material by indirect heating.

13. A method according to claim 11 wherein said reaction material containing water soluble chromate is cooled to less than 100° C. prior to said extraction step.

14. A method according to claim 11 wherein said reaction material containing water soluble chromate is removed from said reaction vessel by an enclosed screw conveyor.

15. A method according to claim 11 wherein said multistage counter current extraction of said extracting step comprises at least a four stage counter current extraction process comprising:

a first stage comprising a first mixing step mixing said reaction material containing water soluble chromate received from said cooling step with an aqueous solvent containing dissolved chromates, said aqueous solvent containing dissolved chromates being received from a second stage liquid-solid separation step, with said first mixing step resulting in a first mixture wherein the aqueous solvent increases in dissolved chromate content and said reaction material decreases in soluble chromate content;

subjecting said first mixture to a first liquid-solid separation step with separated aqueous solvent containing increased dissolved chromate content being supplied to said evaporation step and separated solid reaction material containing decreased soluble chromate content being supplied to a second mixing step of said second stage;

performing said second mixing step of said second stage by mixing said reaction material with said reduced water soluble chromate content received from said first liquid-solid separation step with aqueous solvent containing dissolved chromates received from a third stage liquid-solid separation step, with said second mixing step resulting in a second mixture wherein the aqueous solvent received from said third stage liquid-solid separation step increases in dissolved chromate content and said reaction material further decreases in water soluble chromate content;

subjecting said second mixture to said second stage liquid-solid separation step to separate said aqueous solvent containing increased dissolved chromate content for supply to said first stage mixing step and to provide separated solid reaction material containing further decreased soluble chromate content which is supplied to a third mixing step of said third stage;

performing said third mixing step of said third stage by mixing said reaction material with said further decreased water soluble chromate content received from said second stage liquid-solid separation step with aqueous solvent containing dissolved chromates received from a fourth stage liquid-solid separation step, with said third mixing step resulting in a third mixture wherein the aqueous solvent received from said fourth stage liquid-solid separation step increases in dissolved chromate content and said reaction material received from said second liquid-solid separation step still further decreases in water soluble chromate content;

subjecting said third mixture to said third stage liquid-solid separation step to separate said aqueous solvent containing increased dissolved chromate content for supply to said second stage mixing step and to provide separated solid reaction material containing still further decreased water soluble chromate content which is supplied to a fourth mixing step of said fourth stage;

performing said fourth mixing step of said fourth stage by mixing said reaction material with said still further decreased water soluble chromate content received from said third stage liquid-solid separation step with aqueous solvent, with said fourth mixing step resulting in a fourth mixture wherein the aqueous solvent increases in dissolved chromate content and said reaction material received from said third stage liquid-solid separation step yet still further decreases in water soluble chromate content;

subjecting said fourth mixture to said fourth stage liquid-solid separation step to separate aqueous solvent containing increased dissolved chromate content for supply to said third stage mixing step and to provide separated solid reaction material containing yet still further decreased water soluble chromate content.

16. A method in accordance with claim 15 wherein said aqueous solvent used in said fourth mixing step is clean feed aqueous solvent substantially free from dissolved chromates and said solid reaction material containing said yet still further decreased water soluble chromate content provided by said fourth liquid-solid separation step is clean material substantially free from water soluble chromate content.

17. A method according to claim 16 wherein said aqueous solvent used in said fourth mixing step is aqueous solvent containing dissolved chromate received from a fifth stage liquid-solid separation step and said solid reaction material containing said yet still further decreased soluble chromate content provided by said fourth liquid-solid separation step is supplied to a fifth stage mixing step.

18. A method according to claim 1 wherein in said sizing step, said dried material containing chromium is sized to particle size of less than 0.044 mm.

19. A method according to claim 11 wherein in said sizing step, said dried material containing chromium is sized to a particle size of less than 0.044 mm.

* * * * *